No. 852,682. PATENTED MAY 7, 1907.
A. SCHUERMANN.
SOFT METAL GASKET FOR SERVICE CLAMPS.
APPLICATION FILED SEPT. 9, 1904.

Witnesses.
Ina Graham
Fay Graham

Inventor.
Anton Schuermann,
by W. P. Graham
his attorney.

UNITED STATES PATENT OFFICE.

ANTON SCHUERMANN, OF DECATUR, ILLINOIS, ASSIGNOR TO H. MUELLER MANUFACTURING COMPANY, OF DECATUR, ILLINOIS, A CORPORATION OF ILLINOIS.

SOFT-METAL GASKET FOR SERVICE-CLAMPS.

No. 852,682.     Specification of Letters Patent.     Patented May 7, 1907.

Application filed September 9, 1904. Serial No. 223,939.

*To all whom it may concern:*

Be it known that I, ANTON SCHUERMANN, of the city of Decatur, county of Macon, and State of Illinois, have invented a certain new and useful Soft-Metal Gasket for Service-Clamps, of which the following is a specification.

This invention relates to service clamps used in tapping pipes and forming a permanent attachment thereto, and it provides a gasket which is always continuous and which may be readily secured to the saddle of the clamp.

The gasket comprises a circular, or approximately circular ring, preferably circular in cross section, and lugs extending radially from the ring at opposite points in the circumference thereof. The gasket and the lugs are made of lead, or other soft metal, and the entire device is preferably cast integral.

Figure 1:
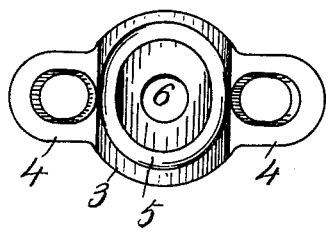
Figure 2:
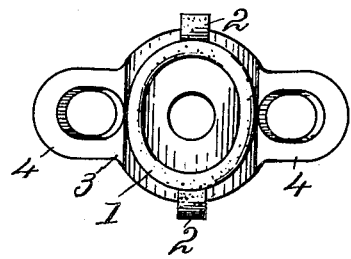
Figure 3:
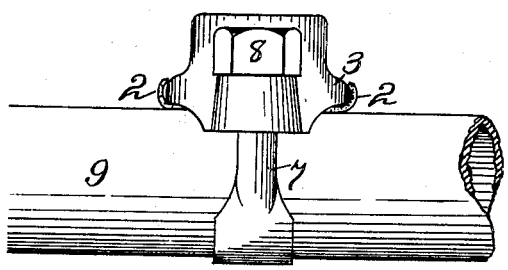
Figure 4:
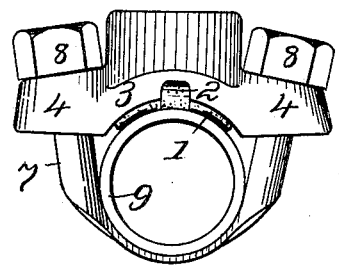
Figure 5:
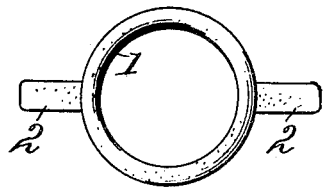
Figure 6:

In the drawings forming part of this specification Figure 1 is a plan of the inner surface of a saddle of a service clamp, showing the saddle grooved to receive the gasket. Fig. 2 is a plan of the inner surface of the saddle, showing the gasket in place. Fig. 3 is a side view of a segment of pipe showing the service clamp attached to the pipe. Fig. 4 is an end view of a segment of pipe, with service clamp attached. Fig. 5 is a plan of the gasket. Fig. 6 is an elevation, or edge view of the gasket.

The clamp saddle 3 is slightly curved or dished on its under side (see Fig. 4) to approximate the curvature of the pipe 9, and at opposite sides it has the usual slotted ears 4, through which the threaded ends of strap 7 extend, it has the threaded bore 6, through which the cock is connected with the pipe, and it also has the groove 5 which forms a seat or bearing for the gasket.

The gasket 1 is a soft metal ring, preferably circular in cross section, and the means for connecting the gasket with the saddle of the service clamp consists of lugs, or extensions, 2, which are preferably flat and thin and project from opposite sides of the ring about midway of its thickness, as seen in Fig. 6, so that they will lie against the under face of the saddle and not prevent the ring from fitting snugly within the groove 5.

In applying the gasket to the saddle, the ring is slightly bent on a line at right angles to the lugs so as to fit into the dished groove 5, and it is then pressed to place in the groove 5 by the fingers of the operator and the lugs are bent around the edges of the saddle at points quartering to the ears 4, as shown in Figs. 2, 3 and 4. After the gasket is thus securely connected with the saddle, the saddle may be handled roughly, transported, and finally placed in any position against the pipe without danger of losing the gasket or of having the gasket become misplaced. In applying the service clamp to the pipe, the gasket is compressed firmly between the pipe and the saddle by tightening up the nuts 8 on the strap 7.

The continuity of the ring assures an unbroken gasket, as distinguished from gaskets formed of lead wire bent to shape and placed end to end, and the cross-sectional extension of the body of the gasket facilitates the compression of the gasket into inequalities of surface of the pipe and of the saddle.

I claim;—

1. A gasket for service clamps, the same consisting of a continuous ring of soft metal which is circular in cross section; and integral, pliable, flat, radial lugs projecting from opposite sides thereof and of lesser thickness than the ring.

2. In a service clamp, the combination with the saddle having a dished face provided with a groove, perforated ears on opposite sides of the saddle, and a strap engaging said ears for attaching the saddle to a pipe; of a gasket comprising a soft ring fitting said groove and thicker than its depth, and thin, pliable lugs projecting oppositely from said ring at the center of its thickness along the dished face of said saddle and engaging the edges of the latter at points quartering to its ears.

In testimony whereof I sign my name in the presence of two subscribing witnesses.

ANTON SCHUERMANN.

Witnesses:
  R. MUELLER,
  JOHN L. WADDELL.